United States Patent
Meunier et al.

(10) Patent No.: US 7,743,327 B2
(45) Date of Patent: Jun. 22, 2010

(54) TABLE OF CONTENTS EXTRACTION WITH IMPROVED ROBUSTNESS

(75) Inventors: Jean-Luc Meunier, St. Nazaire les Eymes (FR); Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1156 days.

(21) Appl. No.: 11/360,963

(22) Filed: Feb. 23, 2006

(65) Prior Publication Data

US 2007/0196015 A1    Aug. 23, 2007

(51) Int. Cl.
    G06F 17/21    (2006.01)
(52) U.S. Cl. .................................................. 715/255
(58) Field of Classification Search ................ 715/531, 715/513, 514, 255
    See application file for complete search history.

(56) References Cited

U.S. PATENT DOCUMENTS

| | | | |
|---|---|---|---|
| 5,434,962 A | 7/1995 | Kyojima et al. | |
| 5,491,628 A | 2/1996 | Wakayama et al. | |
| 5,832,520 A * | 11/1998 | Miller | 707/203 |
| 5,923,334 A * | 7/1999 | Luken | 345/423 |
| 6,298,357 B1 | 10/2001 | Wexler et al. | |
| 6,336,124 B1 * | 1/2002 | Alam et al. | 715/205 |
| 6,487,566 B1 | 11/2002 | Sundaresan | |
| 6,490,603 B1 | 12/2002 | Keenan et al. | |
| 6,539,387 B1 * | 3/2003 | Oren et al. | 707/100 |
| 2002/0143818 A1 | 10/2002 | Roberts et al. | |
| 2003/0093760 A1 | 5/2003 | Suzuki et al. | |
| 2003/0208502 A1 | 11/2003 | Lin | |
| 2004/0003028 A1 | 1/2004 | Emmett et al. | |
| 2004/0024780 A1 | 2/2004 | Agnihotri et al. | |
| 2004/0205461 A1 * | 10/2004 | Kaufman et al. | 715/500 |
| 2006/0253441 A1 * | 11/2006 | Nelson | 707/7 |

OTHER PUBLICATIONS

Déjean et al., "Structuring Documents According to Their Table of Contents," Doc. Eng. '05, Bristol, UK, Nov. 2-4, 2005.
Déjean et al., "A System for Converting PDF Documents into Structured XML Format," 7th IAPR Workshop on Document Analysis Sytems, Nelson, New Zealand, Feb. 13-15, 2006.
Chanod et al., "From Legacy Documents to SML: A Conversion Framework," 9th European Conf. on Research and Advanced Technology for Digital Libraries, Vienna, Austria, Sep. 18-23, 2005.

(Continued)

Primary Examiner—Doug Hutton
Assistant Examiner—Tionna Smith
(74) Attorney, Agent, or Firm—Fay Sharpe LLP (57) ABSTRACT

In a method for identifying a table of contents in a document (10), text fragments are extracted (12) from the document. There are identified (20, 30, 34, 38): (i) a substantially contiguous group of text fragments as table of content entries and (ii) a different group of text fragments as linked text fragments linked with corresponding table of content entries. During the identifying, a number of text fragments that are candidates for identification as linked text fragments is reduced based on at least one reduction criterion (130). The identified table of contents entries and linked text fragments (110) are validated based on at least one validation criterion (162) related to distribution of the linked text fragments.

20 Claims, 6 Drawing Sheets

OTHER PUBLICATIONS

Adler, S., et al., "Extensible stylesheet language (XSL), Version 1.0," W3C 2001, http://www.w3.org/TR/2001/REC-xsl-20011015/.

Aiello, M., Monz, C., Todoran, L., Worring, M., "Document understanding for a broad class of documents", International Journal on Document Analysis and Recognition (IJDAR), vol. 5, 2002, Springer-Verlag, pp. 1-16.

Anjewierden, A., "AIDAS: Incremental logical structure discovery in PDF documents", Proceedings of the International Conference on Document Analysis and Recognition (ICDAR), Seattle, 2001.

Belaïd, A., Pierron, L., Valverde, N., "Part-of-speech tagging for table of contents recognition", International Conference on Pattern Recognition (ICPR 2000), vol. 4, Sep. 3-8, 2000 Barcelona, Spain.

Dori, D., Doermann, D., Shin, C., Haralick, R., Phillips, I., Buchman, M., Ross, D., "The representation of document structure: A generic object-process analysis", Chapter XX, *Handbook on Optical Character Recognition and Document Image Analysis*, World Scientific Publishing Company, 1995/1996, pp. 000-000.

Dori, D., Doermann, D., Shin, C., Haralick, R., Phillips, I., Buchman, M., Ross, D., "The representation of document structure: A generic object-process analysis", Chapter 16, *Handbook of Character Recognition and Document Image Analysis*, World Scientific Publishing Company, 1997, pp. 421-456.

Klink, S., Dengel, A., Kieninger, T., "Document structure analysis based on layout and textual features", Pcroceedings of Fourth IAPR International Workshop on Document Analysis Systems, DAS 2000, Rio de Janeiro, Brazil, 2000, pp. 99-111.

U.S. Appl. No. 11/032,817, filed Jan. 10, 2005, DeJean et al.
U.S. Appl. No. 11/033,016, filed Jan. 10, 2005, Dejean et al.
U.S. Appl. No. 11/116,100, filed Apr. 27, 2005, Dejean et al.
U.S. Appl. No. 11/032,814, filed Jan. 10, 2005, Dejean et al.
U.S. Appl. No. 11/137,566, filed May 26, 2005, Meunier.
U.S. Appl. No. 10/756,313, filed Jan. 14, 2004, Chidlovskii et al.

Lin, C.C., Niwa, Y., Narita, S., "Logical structure analysis of book document images using contents of information", 4th International Conference on Document Analysis and Recognition (ICDAR'97), Ulm, Germany, Aug. 1997, pp. 1048, 1054.

Lin, X., "Header and footer extraction by page-association", Hewlett-Packard Company Technical Report, 2002, www.hpl.hp.com/techreports/2002/hpl-2002-129.pdf.

Lin, X., "Text-mining based journal splitting", Proceedings of the Seventh International Conference on Document Analysis and Recognition (ICDAR 2003), vol. II, Aug. 3-6, 2003, Edinburgh, Scotland.

Lin, X., Simske, S., "Automatic document navigation for digital content re-mastering", SPIE COnference on Document Recognition and Retrieval XI, Jan. 18-22, 2004, San Jose, CA.

Power, R., Scott, D., Bouayad-Agha, N., "Document Structure", Computational Linguistics, vol. 29, No. 2, 2003, pp. 211-260.

Satoh, S., Takasu, A., Katsura, E., "An automated generation of electronic library based on document image understanding", Proceedings of the Third International Conference on Document Analysis and Recognition (ICDAR'95), vol. 1, Aug. 14-15, 1995, Tokyo, Japan, pp. 163-166.

Summers, K.M., "Automatic discovery of logical document structure", PhD thesis, Cornell University, Computer Science Department, Aug. 1998, pp. 1-181.

Virk, R., "Converting PDF files into XML", *CambridgeDocs*, 2004, www.cambridgedocs.com.

* cited by examiner

TABLE OF CONTENTS EXTRACTION WITH IMPROVED ROBUSTNESS

BACKGROUND

The following relates to the information storage and processing arts. It finds particular application in conjunction with cataloging of legacy documents in a marked-up format such as extensible markup language (XML), standard generalized markup language (SGML), hypertext markup language (HTML), or the like, and will be described with particular reference thereto. However, it is to be appreciated that the following is amenable to other like applications.

There is interest in the information storage and processing arts in converting document databases to a common structured format that is structured based on document content so as to facilitate searching, document categorizing, and so forth. Some suitable structured document paradigms include XML, SGML, HTML, or so forth.

The content of unstructured documents is sometimes arranged by a table of contents that sets forth a document structure employing chapters, sections, or so forth. Thus, there is interest in developing methods and apparatuses for extracting the table of contents from the document, and using the extracted table of contents as a framework for structuring the document.

Some existing methods and apparatuses for extracting tables of content from unstructured documents rely upon detecting document headings having distinctive font sizes, boldfacing, or so forth that can be detected and associated with table of contents entries. If the unstructured document is paginated, then table of contents extraction may rely upon each section indexed in the table of contents starting on a new page. However, this approach can be problematic if the paginated document includes header information at the top of each page.

The reliability of existing table of contents extraction algorithms can be relatively good, but is less than perfect. Algorithms for identifying a table of contents and associated links to chapter headings, section headings, or so forth can generate incorrect linkages, missed table of content entries, or so forth. For example, the content of a heading may be repeated in the body of the chapter or section, creating ambiguity as to which portion of content should be linked. Complex documents may include multiple copies of the table of contents, for example one copy in each volume of a multi-volume document. In such cases, there is a possibility that the extraction algorithm may incorrectly cross-link between the table of content entries. If the source document is an optically scanned document processed by optical character recognition (OCR), then the resulting electronic document may include textual errors that can lead to erroneous linkages.

Accordingly, there is a continuing need in the art for improved methods and apparatuses for enhancing the robustness of table of contents extraction techniques.

INCORPORATION BY REFERENCE

The following are commonly assigned U.S. patent applications, each of which is incorporated herein by reference.

Meunier, "Rapid Similarity Links Computation for Table of Contents Determination" (Xerox ID 20051677-US-NP, Ser. No. 11/360,951 filed Feb. 23, 2006) is incorporated herein by reference in its entirety. This application relates at least to determining similarity links in constructing a table of contents.

Dejean et al., "Structuring Document based on Table of Contents," Ser. No. 11/116,100 filed Apr. 27, 2005 is incorporated herein by reference in its entirety. This application relates at least to organizing a document as a plurality of nodes associated with a table of contents.

Dejean et al., "Method and Apparatus for Detecting a Table of Contents and Reference Determination," Ser. No. 11/032,814 filed Jan. 10, 2005 is incorporated herein by reference in its entirety. This application relates at least to a method for identifying a table of contents in a document. An ordered sequence of text fragments is derived from the document. A table of contents is selected as a contiguous sub-sequence of the ordered sequence of text fragments satisfying the criteria: (i) entries defined by text fragments of the table of contents each have a link to a target text fragment having textual similarity with the entry; (ii) no target text fragment lies within the table of contents; and (iii) the target text fragments have an ascending ordering corresponding to an ascending ordering of the entries defining the target text fragments.

Dejean et al., "Method and Apparatus for Detecting Pagination Constructs Including a Header and a Footer In Legacy Documents," Ser. No. 11/032,817 filed Jan. 10, 2005 is incorporated herein by reference in its entirety. This application relates at least to detecting header and footer content in a document.

Dejean et al., "Method and Apparatus for Structuring Documents based on Layout, Content and Collection," Ser. No. 11/033,016 filed Jan. 10, 2005 is incorporated herein by reference in its entirety. This application relates at least to conversion of a document in a relatively flat layout to a structured document in a hierarchal form.

Meunier, "Method and Apparatus for Determining Logical Document Structure," Ser. No. 11/137,566 filed May 26, 2005 is incorporated herein by reference in its entirety. This application relates at least to processing documents having text arranged in multiple columns on a page.

Chidlovskii et al., "Systems and Methods for Converting Legacy and Proprietary Documents into Extended Markup Language Format," Ser. No. 10/756,313 filed Jan. 14, 2004 is incorporated herein by reference in its entirety. This application relates at least to conversion of legacy and proprietary documents into extended mark-up language format which treats the conversion as transforming ordered trees of one schema and/or model into ordered trees of another schema and/or model.

BRIEF DESCRIPTION

According to certain aspects illustrated herein, a method is disclosed for identifying a table of contents in a document. Text fragments are extracted from the document. There are identified: (i) a substantially contiguous group of text fragments as table of content entries and (ii) a different group of text fragments as linked text fragments linked with corresponding table of content entries. During the identifying, a number of text fragments that are candidates for identification as linked text fragments is reduced based on at least one reduction criterion.

According to certain aspects illustrated herein, a method is disclosed for identifying a table of contents in a document. Text fragments are extracted from the document. There are identified: (i) a substantially contiguous group of text fragments as table of content entries and (ii) a different group of text fragments as linked text fragments linked with corresponding table of content entries. The identified table of contents entries and linked text fragments are validated based on at least one validation criterion related to distribution of the linked text fragments.

According to certain aspects illustrated herein, an apparatus is disclosed for identifying a table of contents in a document. A text fragmenter extracts text fragments from the document. A table of contents region identifier identifies a contiguous sub-set of the text fragments as a table of contents region. A table of content extractor identifies (i) a substantially contiguous group of text fragments within the table of contents region as table of content entries, and (ii) a different group of text fragments as linked text fragments linked with corresponding table of content entries.

DETAILED DESCRIPTION

Various techniques can be used for extracting a table of contents from a document. Typically, the output of a table of contents extractor is a set of text fragments (possibly represented by pointers to points within the document) corresponding to table of content entries, each of which is coupled with a linked text fragment (again, possibly represented by a document pointer) indicating the corresponding chapter heading, section heading, or other heading. The links between table of content entries and linked text fragments (e.g., headings) can be identified based on various criteria, such as use of distinctive heading font size and/or font style, arrangement of text fragments on a page, or so forth.

In the following, an illustrative example table of contents extraction approach based on textual similarity of text fragments, rather based on font characteristics, physical page layout, or so forth, is set forth. Insofar as font characteristics, page layout, and so forth may be lost or modified during document conversion processes or when the document is stored in certain formats (such as plain text), the example textual similarity-based table of content extractor has certain advantages in terms of robustness. Methods and apparatuses for improving the robustness of table of contents extraction are illustratively set forth herein with example reference to the illustrative textual similarity-based table of content extractor; however, it is to be understood that the methods and apparatuses for table of contents extraction with improved robustness disclosed herein will generally find application in conjunction with various types of table of contents extraction techniques such as those based on font characteristics, those based on page layout, or so forth.

Figure 1:
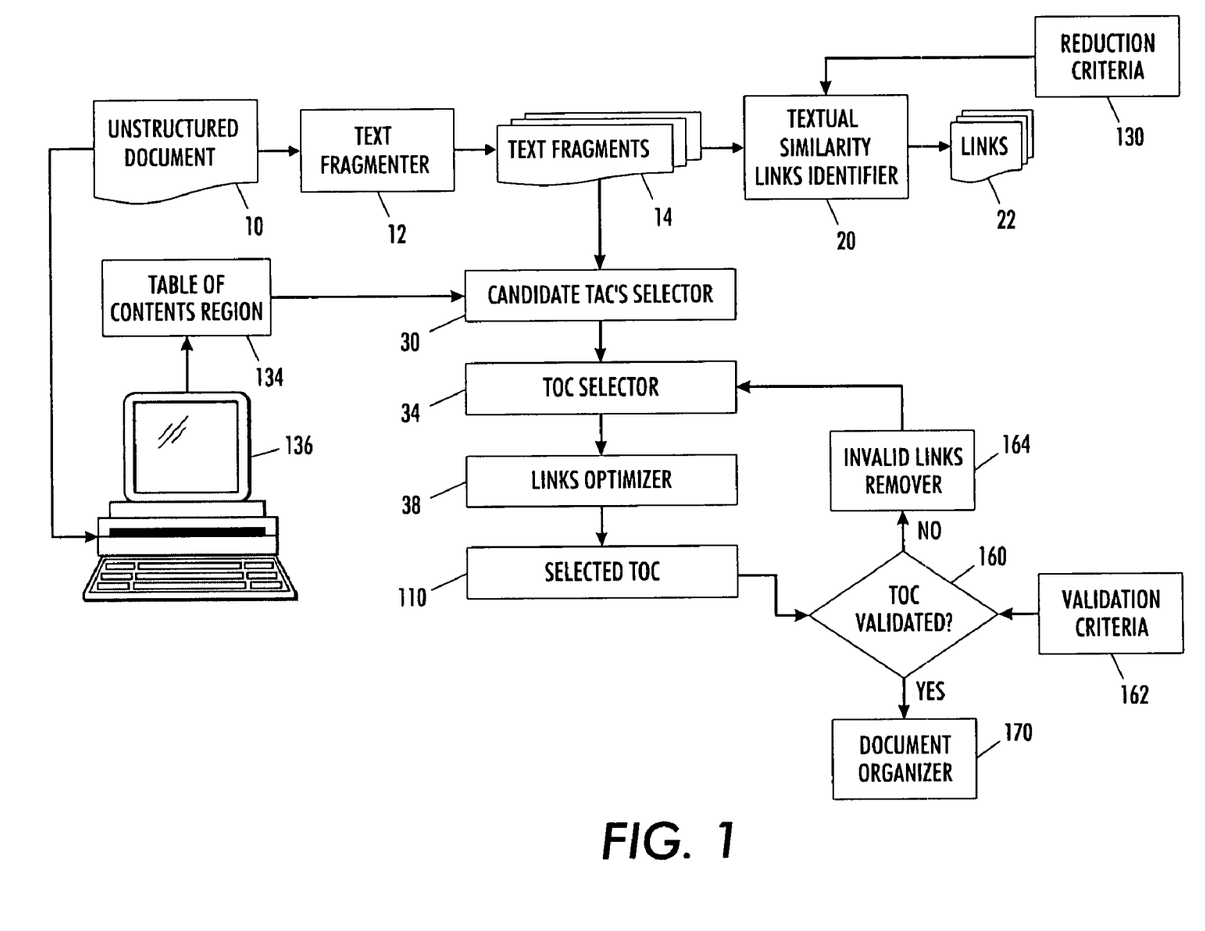
FIG. 1 diagrammatically shows an apparatus for identifying a table of contents.

With reference to FIG. 1, an apparatus is described for identifying a table of contents in an unstructured document 10. A text fragmenter 12 breaks the unstructured document 10 into an ordered sequence of text fragments 14. Typically, the unstructured document 10 is loaded as a list of text strings from a text or XML file produced from a document in an input format (such as Adobe PDF, Word FrameMaker, or so forth), using an off-the-shelf converter. A paper document is suitably scanned using an optical scanner and processed by optical character recognition (OCR). For a text document, each line suitably becomes a fragment ordered line by line. For an XML or HTML document, each PCDATA suitably becomes a text fragment.

Several strategies can be used to order the textual fragments: depth-first left-to-right traversal (document order) or use of the fragment position in the page. Also, the relationship between XML nodes and text fragments can be preserved in order to map the detected table of contents and references back onto XML nodes at the end of the process. It is to be appreciated that the text fragmenter 12 can fragment the textual content in lines, blocks, series of words of a line, or even may split a word across two text fragments (for example, due to a different formatting on the first character of the first word of a title). The resulting ordered sequence of text fragments 14 is processed by a textual similarity links identifier 20 that identifies links 22. Each link is defined by a pair of textually similar text fragments. The text fragments of the pair defining the link are identified herein as source and target text fragments. The source text fragment is a candidate for being a table of contents entry, while the target text fragment is a candidate linked text fragment corresponding to the candidate table of contents entry.

There are various ways of defining such pairs of text fragments. In general, for N fragments, the computation of links is of order $O(N^2)$. Additionally, the possible presence of noise in the text should be accounted for. Noise can come from various sources, such as incorrect PDF-to-text conversion, or table of contents-specific problems such as a page number that appears in the table of contents but not in the document body, or a series ellipses ( . . . ) that relate the page number to the section title in the table of contents. In some embodiments, each text fragment is tokenized into a series of alphanumeric tokens with non-alphanumeric separators such as tabs, spaces, or punctuation signs. In some embodiments, a Jaccard is used to measure textual similarity. The Jaccard is computed as the cardinal of the intersection of the two token sets defined by candidate source and target text fragments divided by the cardinal of the union of these two token sets. A link is defined for those pairs in which the Jaccard measure is above a selected matching threshold. In other embodiments an edit distance or other suitable measure is used as the textual similarity comparison. For an edit distance measure, the threshold is a maximum—those pairs having an edit distance less than an edit distance threshold are designated as textually similar pairs.

Figure 2:
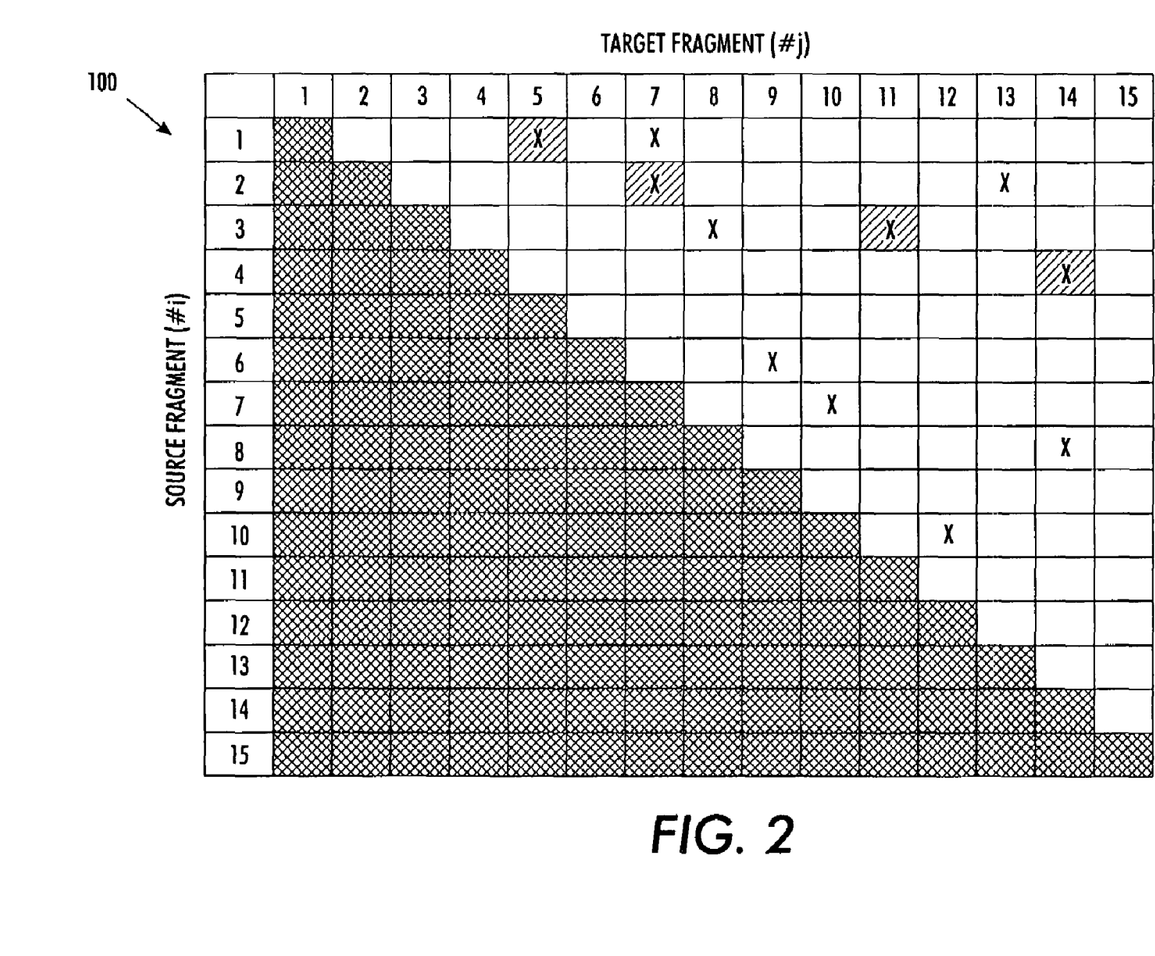
FIG. 2 shows a similarity matrix for a document consisting of fifteen text fragments.

With brief reference to FIG. 2, the textual similarity links are suitably visualized using a similarity matrix 100. Designating as (#i, #j) a link between a source text fragment #i and a target fragment #j, if a link (#i, #j) satisfies the threshold or other link selection criterion, then the link (#j, #i) also satisfies the threshold or other link selection criterion. Thus, the similarity matrix elements need only be computed for the upper-right half (or equivalently, lower left-half) of the similarity matrix 100. In FIG. 2, links in which the computed Jaccard exceeds a selected threshold are indicated by "X"

marks in the link cells. Moreover, although not shown in FIG. 2 it will be appreciated that each link exceeding the threshold has an associated Jaccard or other metric value that indicates the strength of the link in terms of textual similarity.

Figure 3:
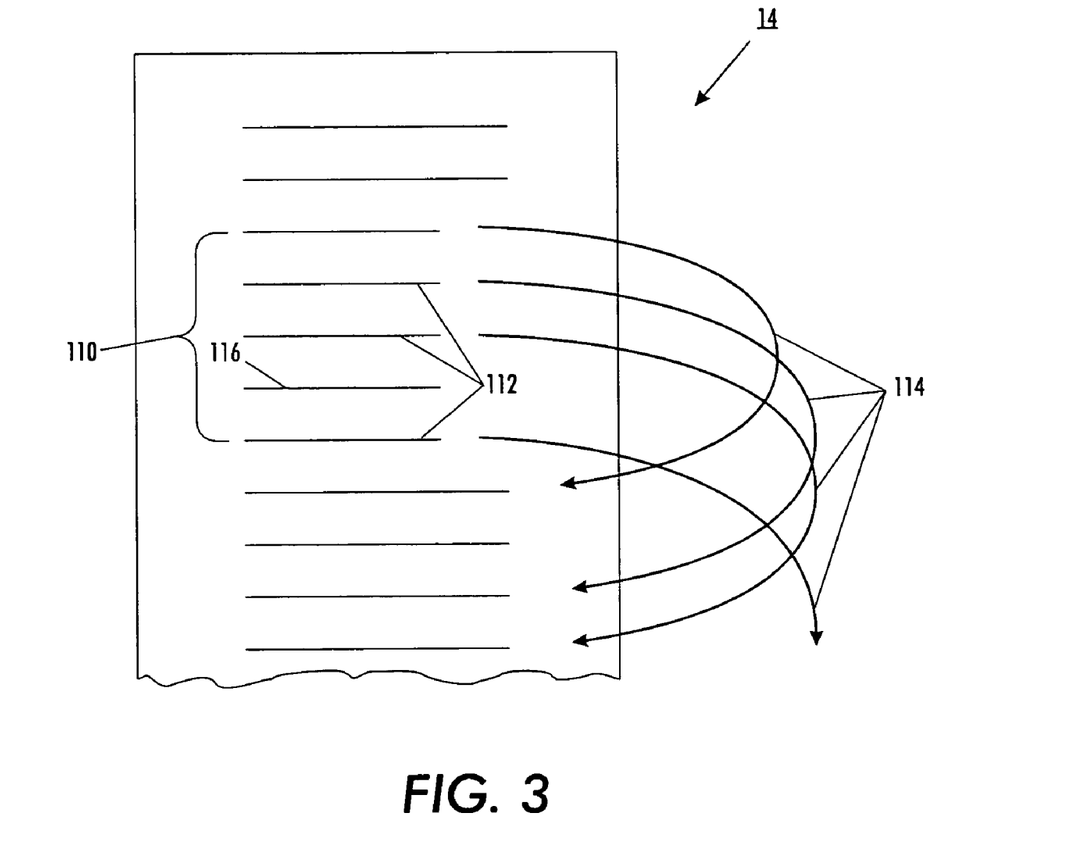
FIG. 3 diagrammatically shows an identified table of contents.

With reference to FIG. 3, a table of contents 110 represents a contiguous sub-sequence of the ordered sequence of text fragments 14. Four general criteria are used to distinguish and identify the table of contents 110 within the ordered sequence of text fragments 14. The first criterion is contiguity. The table of contents includes a contiguous sub-sequence of the ordered sequence of text fragments 14. Most of the text fragments of this contiguous sub-sequence are expected to be entries 112 of the table of contents. Each table of content entry is linked to a portion of the text that follow the table of contents by one of the links 22. These links that are associated with the table of contents 110 are indicated in FIG. 3 as curved arrows 114. It is to be appreciated that the links 114 of the table of contents 110 are a sub-set of the links 22 computed by the textual similarity links identifier 20. However, the links 22 typically include many links in addition to the sub-set of links 114. The sub-set of links 114 denote linked text fragments that correspond with table of content entries.

Although most of the text fragments of the table of contents 110 are entries 112, a small portion of the text fragments in the contiguous sub-sequence of text fragments defining the table of contents 110 may be holes, rather than entries 112. The holes do not have associated links 114, and do not represent a table of contents entry linking to another portion of the document. An example hole 116 is shown in FIG. 3. Typically, a ratio of the number of holes to the number of entries is less than about 0.2. In some embodiments, the maximum acceptable number of holes is a user-selectable parameter. Thus, the table of content entries form a substantially contiguous group of text fragments in the sub-sequence 14.

The second criterion is textual similarity. Each link 114 should connect an entry 112 to a heading or other linked text fragment having text that is similar to the text of the entry. The textual similarity is suitably measured by the Jaccard or other text similarity measure employed by the textual similarity links identifier 20. The target or linked text fragment is typically a section heading in the case of an ordinary table of contents. In the case of a table of contents listing figures of the document (i.e., a table of figures) the target or linked text fragment may be a figure caption. In the case of a table of contents listing tables of the document (i.e., a table of tables) the target or linked text fragment may be a table caption. In some documents the figure and/or table captions may be below the corresponding figures and/or tables.

The third criterion is ordering. The target or linked text fragments of the links 114 should have an ascending ordering corresponding to the ascending ordering of the entries 112. That is, for a set of entries $\{\#i_1, \#i_2, \#i_3, \ldots\}$ having a set of links $\{(\#i_1,\#j_1), (\#i_2,\#j_2), (\#i_3,\#j_3), \ldots\}$ where the set of entries $\{\#i_1, \#i_2, \#i_3, \ldots\}$ have an ascending ordering, it should follow that the ordering of the corresponding set of target fragments $\{\#j_1, \#j_2, \#j_3, \ldots\}$ is also ascending.

The fourth criterion is lack of self-reference. All of the links 114 should initiate from within the table of contents 110, and none of the links 114 should terminate within the table of contents 110. The set of entries $\{\#i_1, \#i_2, \#i_3, \ldots\}$ and the corresponding set of target text fragments $\{\#j_1, \#j_2, \#j_3, \ldots\}$ should have an empty intersection, and moreover none of the target text fragments $\{\#j_1, \#j_2, \#j_3, \ldots\}$ should correspond to a hole text fragment in the table of contents 110.

Figure 4:
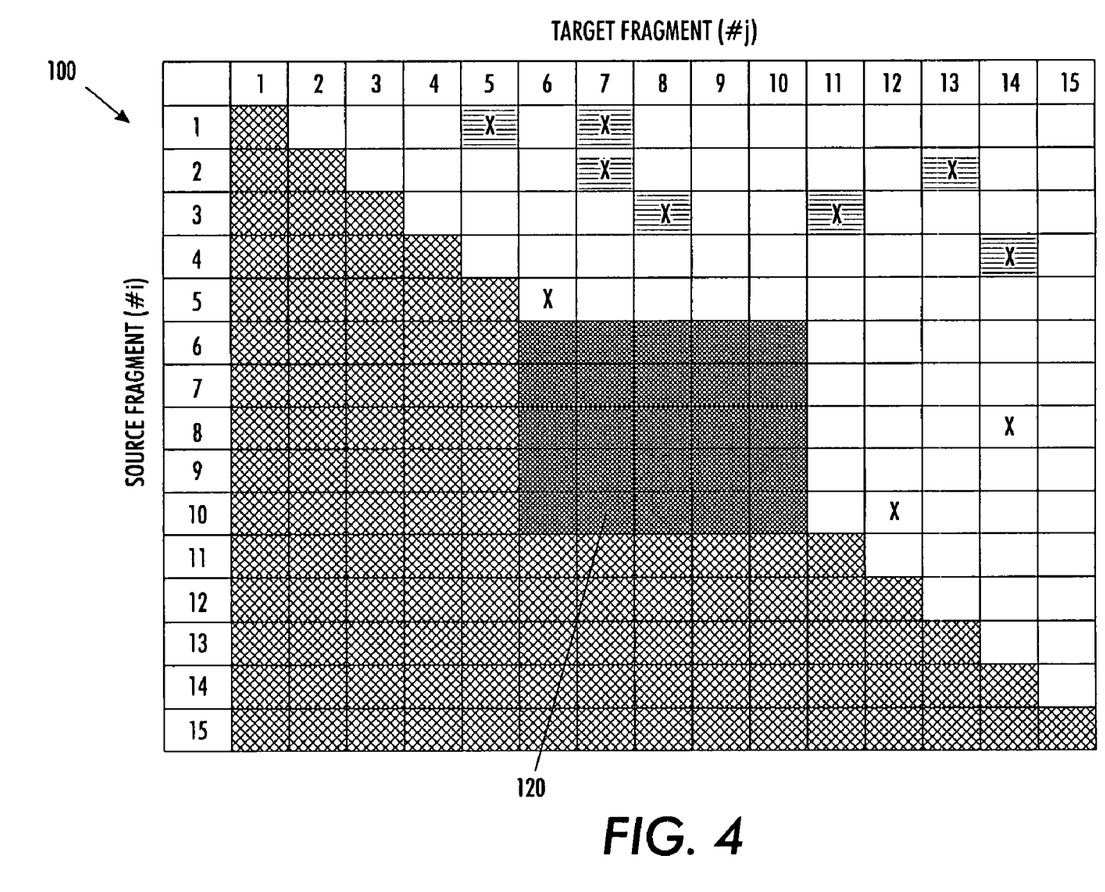
FIG. 4 shows the similarity matrix of FIG. 2 with a portion blocked out due to range restrictions placed on the table of contents.

With reference to FIG. 4, the lack of self-reference along with the observation that the table of contents typically occurs near the beginning of the document can be used to further reduce the search area of the similarity matrix 100. If the table of contents is assumed to be only in the k first and last text fragment, this leaves out the center of the matrix, as shown in dark gray square 120 in FIG. 4 for k=5.

With returning reference to FIG. 1, one approach for selecting from amongst the ordered sequence of text fragments 14 the table of contents 110 including a contiguous sub-sequence of the ordered sequence of text fragments is described. The table of contents is selected based on the contiguity, text similarity, ordering, and non-self-referencing criteria. A candidate tables of contents selector 30 selects one or more candidate tables of contents. In one suitable approach, N hypotheses are tested, corresponding to N candidate starting text fragments for the table of contents. For each of the N possible starting fragments, the hypothesis "Could the table of contents start at this text fragment?" is tested. In some suitable embodiments, the testing starts at the candidate starting text fragment and then looks at each subsequent text fragment in turn to consider it for inclusion in the candidate table of contents. The candidate table of contents is extended by adding subsequent contiguous text fragments until the addition of a new text fragment breaks the ordering constraint. For example, if last added text fragment is a source text fragment having links to target fragments #j=15 and #j=33, and the next text fragment under consideration is a source text fragment having a link only to target fragment #j=20, then this next text fragment can be added to the candidate table of contents since #j=20 is greater than #j=15. If, however, the next text fragment is a source text fragment only having a link to target fragment #j=12, then this would break the ordering. However, it is advantageous to relax the ordering constraint somewhat to allow for a few holes in the candidate table of contents. This is suitably achieved by permitting the presence of a certain number of text fragments without any associated links, and by permitting a certain number of fragments with link-crossing, that is, a text fragment for which all of its associated links break the ordering constraints in the candidate table of contents. Allowing some link-crossing is useful if for example the previous text fragment in the current candidate table of contents contained only one link pointing too far ahead in the document.

To enforce the non-self-referencing constraint, a second pass is suitably performed once the extent of the candidate table of contents is tentatively determined with respect to the ordering constraint. Using a second pass accounts for indeterminacy as to the end of the table of contents, as the table of contents end is unknown while it is being extended from its start point. The second pass starts at the original starting text fragment at the top of the candidate table of contents. Each subsequent text fragment is tested. If a subsequent text fragment includes links only to text fragments within the table of contents, then it violates the non-self-referencing criterion—accordingly, the second pass would terminate the candidate table of contents just before that non-self-reference violating text fragment. Again, however, it may be advantageous to allow a certain number of holes. This is suitably achieved in the second pass by allowing one or a few text fragments of the candidate table of contents to be self-referencing. These text fragments that violate the self-referencing criterion are assumed to be holes, rather than entries, in the candidate table of contents.

This processing is repeated for each of the N possible starting text fragments. The result is a set of one or more candidate tables of contents, each formed of a contiguous list of text fragments. Because the candidate tables of contents were constructed in a way that ensures that the ordering and non-self-reference constraints can be obeyed (while optionally allowing for a limited number of holes), it follows that it is possible to select for each entry of the candidate table of contents one link from its list of acceptable links so that the ordering and non-self-reference constraints are respected. Optionally, filtering criteria may be applied by the candidate tables of contents selector 30 to remove candidate tables of contents that are clearly not correct. For example, a candidate table of contents having fewer than three text fragments may suitably be discarded.

A table of contents selector 34 ranks the candidate tables of contents and selects the highest ranked table of contents. A links optimizer 38 then optimizes the links for that selected table of contents to produce the final selected table of contents 110. In this approach, the table of contents selector 34 ranks the candidate tables of contents using a computationally efficient ranking method, and only the selected table of contents then undergoes the more computationally intensive processing performed by the links optimizer 38. This approach has been found to be satisfactory for accurately selecting the table of contents. A more computationally intensive approach is also contemplated, in which the links optimization is performed for each of the candidate tables of contents and the ranking takes into account the results of the links optimizations.

With continuing reference to FIG. 1, the table of contents selector 34 employs a scoring function to rank the candidate tables of contents. The highest ranked candidate table of contents is then selected for further processing. In some embodiments, the scoring function is the sum of entry weights, where an entry weight is inversely proportional to the number of links associated with an entry of the table of contents. This entry weight characterizes the certainty of any of its associated links, under the assumption that the more links initiate at a given source text fragment, the less likely that any one of those links is a "true" link of a table of contents. Other scoring functions can be employed. For example, another contemplated scoring function sums the number of entries in the candidate table of contents. A short candidate table of contents is typically less likely to be "correct" than a long table of contents in which a large contiguous sequence of text fragments is found to be capable of satisfying the ordering and non-self-referencing criteria. Yet another contemplated scoring function characterizes the span of the target text fragments respective to the entire document 10. If the available target text fragments of a particular candidate table of contents span only a small portion of the document 10, then it is unlikely that the candidate table of contents is the "true" table of contents for that document. These scoring functions are examples, and other scoring functions, or various combinations of scoring functions, can be employed.

Once the highest ranked candidate table of contents has been selected, the links optimizer 38 is applied to that table of contents to produce the final table of contents 110. The selection of the best link for each of the entries of the table of contents involves finding a global optimum for the table of contents while respecting the four table of contents constraints: contiguity, text similarity, ordering, and non-self-referencing. In some embodiments, a weight is associated to each link, which is proportional to its level of matching. In some embodiments, a Viterbi shortest path algorithm is employed in selecting the optimized links. Other algorithms can also be employed for selecting the optimized links.

In some applications, the identified table of contents is used for further processing. For example, the table of contents 110 can be employed to structure the unstructured document 10 by dividing it up into text sections linked to table of contents entries to produce a structured document. When the table of contents is used for automated structuring of the document, it is typically advantageous to strictly enforce the ordering criterion since cross-linking can lead to errors in the formatting of the structured document. While the foregoing has particularly addressed the example application of identifying a table of contents indexing text sections, it is to be appreciated that the disclosed approaches are also applicable to identifying tables of contents indexing other features of a document, such as figures (commonly called a "table of figures"), tables (commonly called a "table of tables"), equations, and so forth.

Having set forth the example illustrative textual similarity-based table of contents extractor, some techniques for improving the robustness of table of contents extraction are set forth with illustrative example application thereto. It is to be appreciated that the techniques disclosed herein are generally applicable to other types of table of contents extraction techniques.

In general, the techniques disclosed herein are based on reducing the number of text fragments which are candidates for table of contents entries and/or for identification as linked fragments based on one or more reduction criteria. Additionally or alternatively, robustness can be improved by validating the identified table of contents entries and linked fragments based on one or more validation criteria related to distribution of the linked text fragments.

With reference to FIG. 1, in some embodiments, one or more reduction criteria 130 are applied by the textual similarity links identifier 20 to reduce the number of text fragments that are candidates for identification as linked text fragments. For example, the reduction criteria 130 may include one or more regular expressions with which text fragments are compared. Text fragments which match the regular expression (or, alternatively, which do not match the regular expression) are excluded as candidates for identification as linked text fragments. For example, the regular expression may set forth an indexing text fragment portion such as a leading numeric index, a leading alphabetic index, a leading roman numeral index, or so forth, and text fragments that do not match or satisfy the indexing fragment portion defined by the regular expression are excluded from consideration as candidate linked text fragments. This approach is useful where the table of contents entries are indexed by, for example, a chapter number (e.g., Chapter 1, . . . Chapter 2, . . . , etc.), alphabetic section index (e.g., "A. Introduction", . . . "B. Description of the problem", . . . etc.), or so forth.

As another example, the regular expression may set forth that the text fragment contain at least one keyword typically indicative of a chapter heading, section heading, or so forth. For example, the keyword may be "part", "section", "chapter", "book", or so forth, or various combinations thereof. Text fragments which do not satisfy the regular expression because they contain none of the keywords indicative of being a heading are excluded. In some such regular expressions, the location of the keyword may be incorporated into the regular expression. For example, the regular expression may be something such as: "Chapter *" which indicates that the text fragment must begin with the capitalized word "Chapter" followed by a space and any other text (as indicated by the trailing asterisk). In other such regular expressions, the expression may be satisfied if the keyword appears anywhere in the text fragment.

Other regular expressions can be used, alone or in combination. As yet another example, the regular expression may require that the text fragment be in all-caps, so that text fragments containing lower-case letters (or more than one or two lower-case letters, or some other similar pattern) are excluded from further consideration by the textual similarity links identifier 20. While the term "regular expression" is used herein, it is to be appreciated that the comparison with the regular expression may be computationally implemented in various ways, such as using a text search algorithm (for finding a keyword in a text fragment), a finite state network-based automaton (for performing comparisons with simple or complex character string patterns), or so forth.

In some embodiments, the one or more reduction criteria 130 include one or more criteria that are based on page position of the text fragments. For such embodiments to be operative, the source document 10 should include page layout information (such as a pdf document which is page layout-based) and the text fragmenter 12 should detect and associate the page position information with the text fragments 14. Page information may include, for example, vertical page position (denoted by a distance from top of page, a line number, or so forth). If the source document 10 has a multi-column format, then the page information may include a column index for each text fragment indicating which column the text fragment was extracted from.

Some suitable page position based reduction criteria are as follows: (i) limit candidate text fragments for consideration as links to those text fragments within a selected distance from a top of the page (this criterion assumes that sections or chapters typically start at the top of a page); and/or (ii) limit candidate text fragments for consideration as links to those text fragments whose associated column index corresponds to a leftmost column (this criterion assumes that sections or chapters typically start at the leftmost column of a page). Other page position based reduction criteria may be applicable depending upon a priori knowledge of the document page layout.

Regular expression-based reduction criteria are suitably applied respective to reduce the number of candidate linked text fragments, or to reduce the number of table of content entries, or to reduce both the number of candidate linked text fragments and the number of table of content entries. Certain criteria may be better suited for reducing the number of candidate linked text fragments but not well suited for reducing the number of candidate table of content entries. For example, page layout-based reduction criteria may be applicable to reducing the number of candidate linked text fragments, since chapter or section headings are likely to be organized at top of page or so forth, whereas such page layout-based criteria may be inapplicable to the table of content entries which may form a list of entries that span one or more pages.

In some embodiments, a contiguous sub-set of the text fragments are identified as a table of contents region 134. For example, a user interface 136 can be configured to receive a user identification of the table of contents region. As one example, the user may scan in the source document 10, and at the time of scanning indicate which scanned page or pages contain the table of contents. Then, when the text fragmenter 12 fragments the source document 10 to produce the text fragments 14, those text fragments extracted from the page or pages indicated by the user as containing the table of contents are assigned as the table of contents region 134. In another approach, the table of contents region 134 may be defined as a first portion of the document (for example, the first 5% of the total number of text fragments 14, or the first 10%, or so forth), in recognition of the expectation that the table of contents is likely to be near the beginning of the document. This approach reduces the number of candidate table of content entries as well as the number of candidate linked text fragments. A combination of a restrictive table of contents region 134 that restricts the number of candidate table of content entries and application of reduction criteria 130 to reduce the number of candidate linked text fragments can provide substantial improvement in the speed of table of content extraction.

However, these techniques (a restrictive table of contents region 134 and application of one or more reduction criteria 130) do not address another possible problem which can arise, namely the presence of multiple copies of the table of contents. Such a situation can arise, for example, if the document is a multi-volume document and each volume contains a copy of the table of contents. In some document arrangements, only partial copies of the table of contents may be present. For example, a multi-volume document may include a main table of contents listing all chapters or sections, and each volume may include a volume table of contents listing only those chapters or sections contained in that volume.

Figure 5:
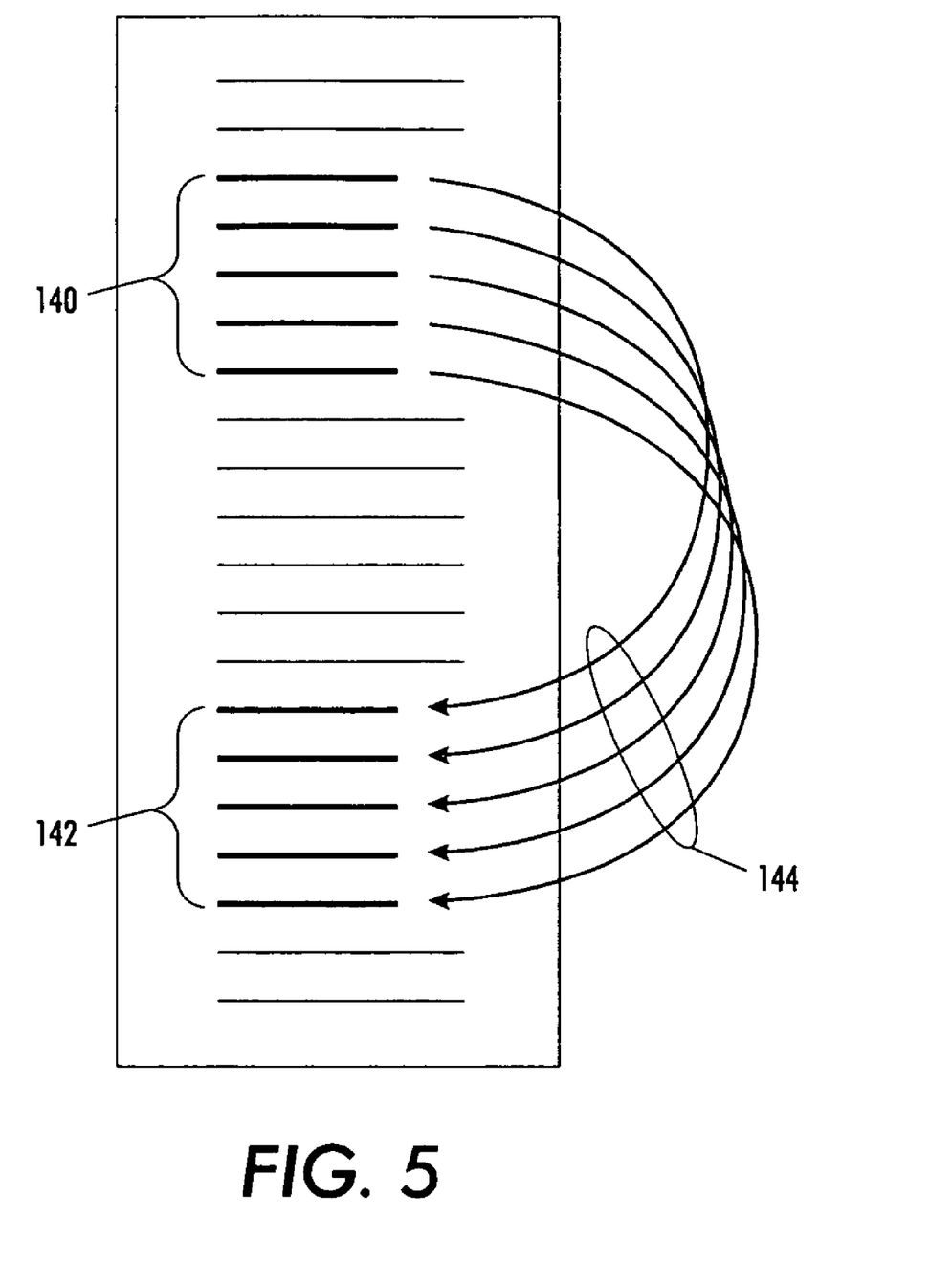
FIG. 5 diagrammatically shows a situation in which a substantially contiguous group of table of content entries is erroneously associated by a table of contents extractor with linked text fragments in a copy of the table of contents.

FIG. 5 illustrates a case in which a document contains a main table of contents 140, and a copy 142 of the table of contents, for example at the beginning of a second volume of the document. Because the copy 142 contains substantially similar, or possibly even exact, duplicates of the entries of the table of contents 140, it is possible, or perhaps even likely, that the table of contents identification process may erroneously identify as linked text fragments 144 the text fragments of the copy 142. FIG. 5 illustrates a "worst-case" scenario in which every entry of the table of contents 140 is erroneously linked with a corresponding entry of the copy 142.

Figure 6:
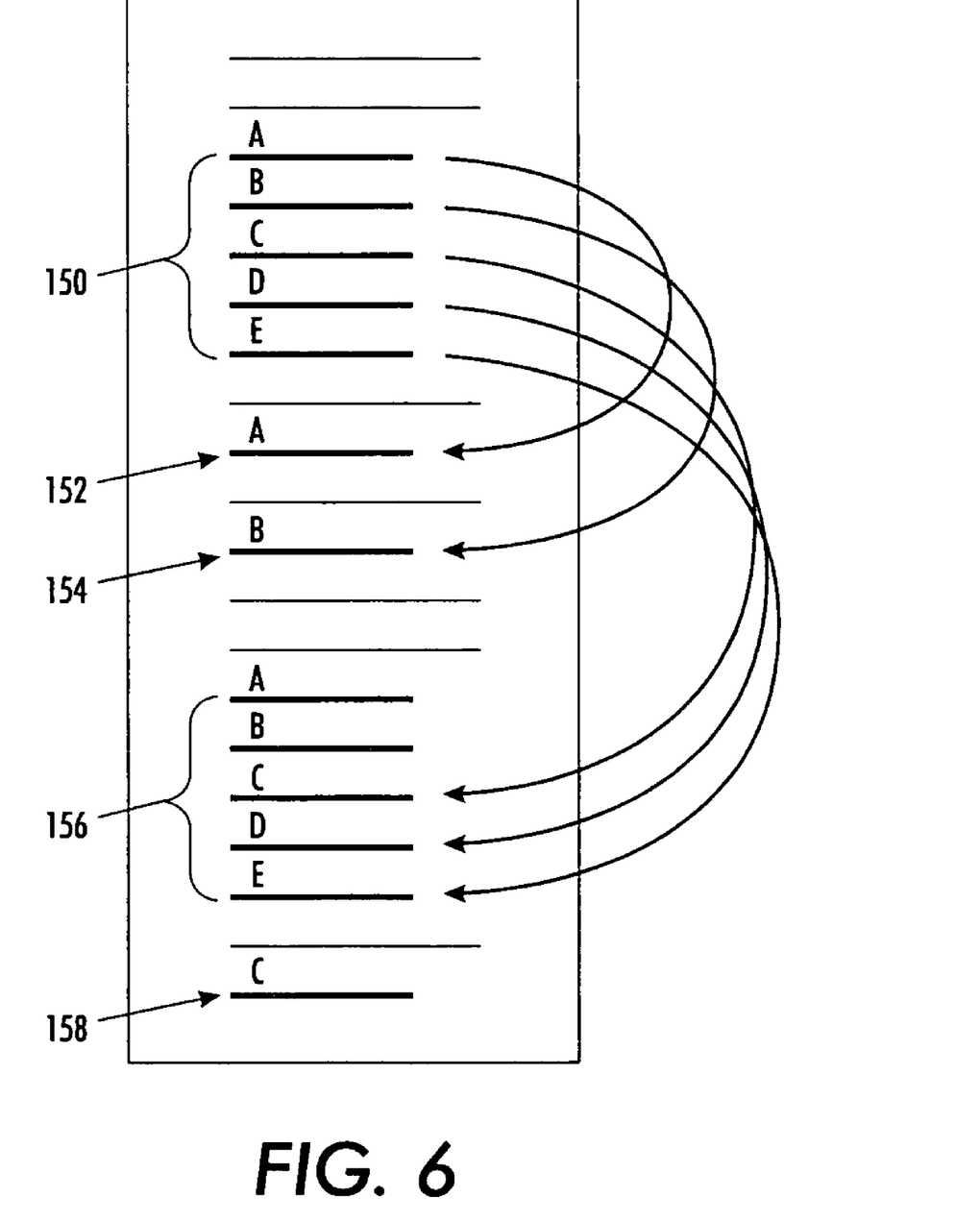
FIG. 6 diagrammatically shows a situation in which a substantially contiguous group of table of content entries is partially correctly associated by a table of contents extractor with linked text fragments that are section headings, and is partially erroneously associated by the table of contents extractor with linked text fragments in a copy of the table of contents.

FIG. 6 illustrates a less dramatic situation in which a document contains a table of contents 150, section headings 152, 154 (corresponding to sections A and B) in a first volume, a copy 156 of the table of contents at the start of a second volume, and another section heading 158 ("corresponding to section C) in the second volume. Here, the table of content entries for sections A and B are correctly associated with linked text fragments corresponding to the section headings 152, 154. However, the table of content entries for sections C, D, and E are erroneously associated with linked text fragments within the copy 156 of the table of contents, and the section heading 158 (corresponding to section C) is erroneously not identified as a linked text fragment. A similar situation can arise where each volume includes a partial copy of the table of contents listing only those chapters or sections contained in that volume.

With returning reference to FIG. 1, to address situations such as the example situations illustrated in FIGS. 5 and 6, the selected table of contents 110 is suitably validated by a table of contents validator 160 based on one or more validation criteria 162 that are related to distribution of the linked text fragments. One suitable validation criterion is the fraction of the document spanned by the linked text fragments. This criterion is effective for identifying situations such as that of FIG. 5, since the copy of the table of contents is unlikely to span a very large portion of the linked text fragments. In some suitable embodiments, the selected table of contents 110 is validated (at least respective to this validation criterion) if the span of the linked text fragments is greater than a validation fraction threshold of about 10% to 20%. Note that this criterion may fail to identify erroneous situations such as that of FIG. 6, in which only some of the linked text fragments are erroneously in the copy of the table of contents, because in such cases the span of the linked text fragments including both correct and incorrect linkages may be larger than the validation fraction threshold.

Another approach for addressing a situation like that of FIG. 5 in which there are one-to-one mappings between the table of contents 140 and the copy 142 is to invalidate any contiguous group of linked text fragments that have a one-toone correspondence with a more than a threshold number of contiguous table of content entries. This can be done by the table of contents validator 160. When such a contiguous group of one-to-one linked text fragments is found, an invalid links remover 164 removes the contiguous group of linked text fragments from the group of text fragments identified as linked text fragments, and the table of contents selector 34 and links optimizer 38 updates the identification of the selected table of contents 110 including the linked text fragments with that contiguous group of linked text fragments removed or excluded as candidates for identification as linked text fragments. This approach works well for exact copies of the table of contents such as is shown in FIG. 5, and for partial copies of the table of contents in which the partial copy includes a contiguous group of more than the threshold number of contiguous one-to-one linked text fragments. However, it will not recognize "substantial" copies of the table of contents which include gaps or other breaks in the one-to-one contiguity.

To address situations such as that of FIG. 6, or situations in which partial copies of the table of contents are erroneously linked, the one or more validation criterion 162 suitably include a criterion that validates conditional upon the linked text fragments not being within a substantial copy of the substantially contiguous group of text fragments identified as table of content entries. To apply this validation criterion, a suitable technique should be used to search for a substantial copy of the substantially contiguous group of text fragments identified as table of content entries. The search technique should tolerate some differences between the table of contents and the copy to account for noise due to document imperfections, erroneous links, holes in the table of contents, and so forth. Additionally, the search technique should be able to identify a partial copy as a substantial copy of the substantially contiguous group of text fragments identified as table of content entries.

In one suitable approach, the search technique compares the table of content entries with a candidate copy using a figure of merit including at least (i) a measure of textual similarity between the table of content entries and text fragments of the candidate copy and (ii) a longest common string contained in both the table of content entries and the candidate copy. If the table of contents extractor uses a textual similarity-based process (such as the example illustrative textual similarity-based table of contents extractor described herein), then the links 22 readily provide the measure of textual similarity between the table of content entries and text fragments of the candidate copy. For table of contents extractors employing font-based or other processes, the Jaccard similarity measure employed herein, or another text similarity measure, can be used.

The longest common string component sequentially compares pairs of fragments. When two fragments are not equal, rather than exploring the two possibilities as is typically done in longest common string-type algorithms, (that is, ignoring one or the other), the one that comes first in the page reading order is ignored. This lets copies be found with linear complexity and no storage, while tolerating a given maximum number of differences per page. In a suitable approach, given a table of contents candidate, the N pairs of text fragments formed by the first table of content entry and each of its N possible corresponding fragments in the document body are considered. Those N pairs indicate the potential starts of a copy of the table of contents. This approach assumes that a table of contents candidate is formed by making an hypothesis regarding its start, so the sequence of matching pairs starts with the first entry. (In other embodiments, it is contemplated to consider all pairs with first pair member being in the M first entries of the table of contents, where M is the maximum number of difference tolerated. This approach may be more robust). For each of the N pairs, the following iterative processing is performed:

```
for fragDoc in TOC_Candidate.firstFrag.links:
    fragToC = TOC_Candidate.firstFrag
    nbError = 0
    While (nbError < nbErrorMax) and not(out-of-toc or out-of-fragment-
    list):
        #Reset the error count for each new page
        If (fragToC and fragDoc) are-on-top-of-page: nbError = 0
        If fragDoc in fragToC.links:
            #ok, they match pairwise
            fragDoc = fragDoc.next
            fragToC = fragToC.next
        else:
            #we have a difference
            nbError++
            if fragDoC is-after fragToC:
                fragToC = fragToC.next
            else:
                fragDoc = fragDoc.next
        # exit of the while loop
    if (nbError < nbErrorMax) and out-of-toc
        #We found a copy of the ToC
        #We will here remove all the links to the copy from the ToC
        fragments
        . . .
```

The above iterative processing compares pairs of fragments in a sequential manner, tolerating a given maximum of difference per page. The is-after predicate exploits first the page ordering, then the column ordering and eventually the vertical position to compare the position of the two fragments in the document order. A partial copy of the table of contents that shares the same starting point can be found in a similar way. To find partial copies not sharing the same starting point as the complete table of contents, the same method can be applied starting with all table of content entries starting a new page.

The above longest common string-type figure of merit component assumes that the two copies of the table of contents share the same segmentation in columns and pages and the same layout on the page. To relax this constraint, it a more general longest common string-type figure of merit component can be applied, albeit at typically higher processing complexity.

If a copy of the table of contents is found, then the table of contents validator 160 checks whether any of the linked text fragments lie within the copy. If so, then these links are presumed to be invalid, and the invalid links remover 164 removes those linked text fragments located within the substantial copy from the group of text fragments identified as linked text fragments, and the table of contents selector 34 and links optimizer 38 updates the identification of the selected table of contents 110 including the linked text fragments with those text fragments within the substantial copy removed or excluded as candidates for identification as linked text fragments. The process iterates until a table of contents is selected which does not include links to a copy of itself.

Once validated, the selected table of contents 110 is suitably used for various purposes. For example, a document organizer 170 can use the extracted table of contents including the a substantially contiguous group of text fragments defining the table of content entries and the different group of text fragments defining linked text fragments that are linked with corresponding table of content entries to organize the document into a structured XML, HTML, or otherwise structured document.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for identifying a table of contents in a document, the method comprising:
   extracting text fragments from the document;
   identifying (i) a contiguous group of the text fragments as table of content entries and (ii) a different group of the text fragments as linked text fragments linked with corresponding table of content entries; and
   during the identifying, reducing a number of text fragments that are candidates for identification as linked text fragments based on at least one reduction criterion;
   wherein a small portion of the identified table of content entries comprise holes that do not have associated linked text fragments, a ratio of the number of the holes to the number of linked table of content entries being a user-selectable parameter that is less than about 0.2.

2. The method as set forth in claim 1, wherein the reducing comprises:
   comparing text fragments with a regular expression, text fragments that one of (i) match, or (ii) do not match, the regular expression being excluded as candidates for identification as linked text fragments.

3. The method as set forth in claim 1, wherein the reducing comprises:
   comparing text fragments with a regular expression setting forth an indexing text fragment portion, text fragments being selectively excluded as candidates for identification as linked text fragments based on the comparing.

4. The method as set forth in claim 3, wherein the initial index-identifying text fragment portion is one of (i) a leading numeric index, (ii) a leading alphabetic index, and (iii) a leading roman numeral index.

5. The method as set forth in claim 1, wherein the reducing comprises:
   comparing text fragments with a regular expression setting forth that the text fragment is capitalized, text fragments being selectively excluded as candidates for identification as linked text fragments based on the comparing.

6. The method as set forth in claim 1, wherein the reducing comprises:
   comparing text fragments with a regular expression setting forth that the text fragment contain at least one keyword selected from a group of keywords consisting of at least one of: "part", "section", "chapter", and "book", text fragments being selectively excluded as candidates for identification as linked text fragments based on the comparing.

7. The method as set forth in claim 6, wherein the regular expression further sets forth that the at least one contained keyword be located in a selected position or range of positions within the text fragment.

8. The method as set forth in claim 1, wherein the extracting of text fragments includes associating page positions with the text fragments, and the reducing comprises:
   limiting the candidates for identification as linked text fragments based on the associated page positions.

9. The method as set forth in claim 8, wherein the associated page positions include at least associated vertical page positions, and the limiting comprises: limiting the candidates for identification as linked text fragments to fragments whose associated vertical page position is within a selected distance from a top of the page.

10. The method as set forth in claim 8, wherein the associated page positions include at least column indices, and the limiting comprises:
    limiting the candidates for identification as linked text fragments to fragments whose associated column index corresponds with a leftmost column.

11. The method as set forth in claim 1, further comprising: structuring the document based on the identified table of content entries and linked text fragments.

12. A method for identifying a table of contents in a document, the method comprising:
    extracting text fragments from the document;
    identifying (i) a contiguous group of the text fragments as table of content entries and (ii) a different group of the text fragments as linked text fragments linked with corresponding table of content entries, wherein a small portion of the identified table of content entries comprise holes that do not have associated linked text fragments, a ratio of the number of the holes to the number of linked table of content entries being a user-selectable parameter that is less than about 0.2; and
    validating the identified table of contents entries and linked text fragments based on at least one validation criterion related to distribution of the linked text fragments.

13. The method as set forth in claim 12, wherein the at least one validation criterion comprises:
    validate conditional upon a span of the linked text fragments being greater than a validation fraction threshold of the total span of the extracted text fragments.

14. The method as set forth in claim 13, wherein the validation threshold fraction is between about 10% and about 20%.

15. The method as set forth in claim 12, wherein the at least one validation criterion comprises:
    validate conditional upon there being no group of contiguous linked text fragments numbering greater than a threshold having one-to-one correspondence with a group of contiguous table of content entries.

16. The method as set forth in claim 12, wherein the at least one validation criterion comprises:
    validate conditional upon no linked text fragments being within a substantial copy of the contiguous group of text fragments identified as table of content entries.

17. The method as set forth in claim 16, wherein the validating further comprises:
    searching for the substantial copy of the contiguous group of text fragments identified as table of content entries by comparing the table of content entries with a candidate copy using a figure of merit including at least (i) a measure of textual similarity between the table of content entries and text fragments of the candidate copy and (ii) a longest common string contained in both the table of content entries and the candidate copy.

18. The method as set forth in claim 16, wherein the substantial copy is a partial copy of the contiguous group of text fragments identified as table of content entries.

19. The method as set forth in claim 16, further comprising:
    conditional upon the validating finding one or more linked text fragments within a substantial copy of the contiguous group of text fragments identified as table of content entries, (i) removing linked text fragments located within the substantial copy from the group of text fragments identified as linked text fragments and (ii) updating the identifying with text fragments within the substantial copy excluded as candidates for identification as linked text fragments.

20. The method as set forth in claim 12, further comprising: structuring the document based on the identified table of content entries and linked text fragments.

* * * * *